United States Patent [19]

Isaka et al.

[11] Patent Number: 5,070,686
[45] Date of Patent: Dec. 10, 1991

[54] VERTICAL ENGINE FOR WALK BEHIND LAWN MOWER

[75] Inventors: Yoshiharu Isaka; Kiyohiko Oguri, both of Iwata, Japan

[73] Assignee: Yamaha Hatsudoki Kabushiki Kaisha, Iwata, Japan

[21] Appl. No.: 380,720

[22] Filed: Jul. 12, 1989

Related U.S. Application Data

[63] Continuation of Ser. No. 155,210, Feb. 12, 1988, abandoned.

[30] Foreign Application Priority Data

Feb. 27, 1987 [JP] Japan .................................. 62-45437

[51] Int. Cl.$^5$ ............................................ A01D 34/68
[52] U.S. Cl. .................................... 56/17.5; 56/320.2; 123/41.58
[58] Field of Search .............. 56/175, 255, 202, 320.1, 56/320.2; 123/41.56, 41.58, 41.7, 41.65

[56] References Cited

U.S. PATENT DOCUMENTS

| | | | |
|---|---|---|---|
| 2,823,508 | 2/1958 | Brown | 56/320.2 |
| 3,091,226 | 5/1963 | Jepson | 123/41.7 |
| 3,183,899 | 5/1965 | Tuggle | 123/41.7 |
| 3,581,717 | 6/1971 | Fullerton | 123/41.65 |
| 4,149,362 | 4/1979 | Haffner et al. | 56/202 |
| 4,328,661 | 5/1982 | Ferguson | 56/320.2 |
| 4,510,739 | 4/1985 | Dluhosch | 56/17.5 |
| 4,570,584 | 2/1986 | Uetsuji et al. | 56/17.5 |
| 4,711,077 | 12/1987 | Kutsukake et al. | 56/320.2 |
| 4,731,981 | 3/1988 | Geringer | 56/320.1 |

FOREIGN PATENT DOCUMENTS

| | | | |
|---|---|---|---|
| 247189 | 3/1963 | Australia | 123/41.7 |
| 2255055 | 5/1973 | Fed. Rep. of Germany | 123/41.7 |
| 2519842 | 11/1976 | Fed. Rep. of Germany | 56/320.1 |
| 2083733 | 3/1982 | United Kingdom | 56/320.1 |
| 2140633 | 12/1984 | United Kingdom | 56/255 |

*Primary Examiner*—John G. Weiss
*Attorney, Agent, or Firm*—Ernest A. Beutler

[57] ABSTRACT

Several embodiments of air cooled rotary lawn mowers wherein the mower is provided with a cooling shroud for directing cooling air downwardly across the engine. The cooling shroud defines an air inlet that is spaced from the discharge chute so that grass clippings are not likely to enter it. The engine is laid out so that the center of gravity of the mower is disposed rearwardly of the axis of the cutting blade for facilitating turning.

10 Claims, 8 Drawing Sheets

VERTICAL ENGINE FOR WALK BEHIND LAWN MOWER

This is a continuation of U.S. patent application Ser. No. 155,210, filed Feb. 12, 1988, now abandoned.

BACKGROUND OF THE INVENTION

This invention relates to a vertical engine for a walk behind type of lawn mower and more particularly to an improved cooling arrangement for such an engine and also to a component layout for the engine that facilitates manipulation of the mower.

The rotary type lawn mower is a very popular type of mower. With such mowers, there is provided a cutting blade that is contained within the mower outer housing and which rotates about a generally vertically extending axis. The cut grass is discharged through a discharge chute formed in the mower housing. The rotary blade is driven by an internal combustion engine that is supported upon the mower housing and which has its output shaft also rotating about a vertically extending axis and coupled to the cutter blade for driving the cutter blade.

With this type of mower, it is the normal practice to provide an air cooling system for the engine. Although this type of mower has considerable advantages, there are certain difficulties in designing a mower that will be completely satisfactory. For example, in order to provide effective air cooling for the engine, the engine is normally provided with some form of cooling shroud and a cooling fan is driven by the engine output shaft for circulating air through the cooling shroud and across the components of the engine to be cooled. However, the air flow through the cooling shroud can easily become obstructed if grass clippings, which tend to swirl around the mower housing, are drawn into the cooling shroud. The accumulation of grass clippings within the cooling shroud will, obviously, adversely effect the cooling efficiency and can give rise to difficulties.

It is, therefore, a principal object of this invention to provide an improved and simplified cooling shroud arrangement for a rotary type lawn mower.

It is another object of this invention to provide an improved cooling shroud arrangement for a mower of this type wherein the ingestion of grass clippings into the cooling shroud is avoided.

It is yet another object of this invention to provide an improved and simplified cooling arrangement for a rotary mower wherein the inlet for the cooling shroud is positioned so that grass clippings are not likely to enter it.

Rotary mowers of the type described also are supported upon four ground engaging wheels that are positioned at the opposite corners of the mower housing. Such an arrangement provides good stability and ensures an even and uniform cut height. The wheels normally are non-dirigibly connected to the mower housing and hence in order to steer the mower it is necessary to lift the front wheels from the ground. However, the component layout for mowers of this type often times does not provide a rearwardly positioned center of gravity that would facilitate such movement.

It is, therefore, a further object of this invention to provide a component layout for a rotary type lawn mower wherein turning is facilitated.

It is a further object of this invention to provide a component layout for a rotary type of lawn mower wherein the center of gravity is rearwardly disposed so as to facilitate lifting of the front wheels from the ground for steering purposes.

SUMMARY OF THE INVENTION

A first feature of this invention is adapted to be embodied in a rotary lawn mower having an outer housing that defines a downwardly opening cavity in which a cutting blade is supported for rotation about a generally vertically extending axis. An air cooled internal combustion engine is supported by the outer housing above the cavity and has at least one horizontally disposed cylinder and an output shaft that rotates about a vertically extending axis. The output shaft of the engine is coupled to the cutting blade for driving the cutting blade. A fan is driven by the engine output shaft and lies above the cylinder. Cowling means enclose the fan and at least portions of the engine for directing the flow of cooling air circulated by the fan. The cowling means defines an air inlet opening for drawing atmospheric air and which is positioned below the fan and in proximity to the outer housing to avoid the drawing of cut grass into the cowling means.

Another feature of the invention is adapted to be embodied in a rotary mower having an outer housing defining a downwardly opening cavity in which a cutting blade is supported for rotation about a generally vertically extending axis. An air cooled internal combustion engine is supported by the outer housing above the cavity and has at least one cylinder that extends horizontally and rearwardly from the axis of the cutting blade. The engine has an output shaft which rotates about a vertically extending axis and which is coupled to the cutting blade for driving it. The engine has overhead valves and the valves are positioned at the rear of the housing and an induction system comprising a carburetor and air cleaner and an exhaust system comprised of a muffler are also disposed at the rear end of the engine so that the center of gravity will be rearwardly disposed for facilitating turning.

DETAILED DESCRIPTION OF THE PREFERRED EMBODIMENTS OF THE INVENTION

Figure 1:
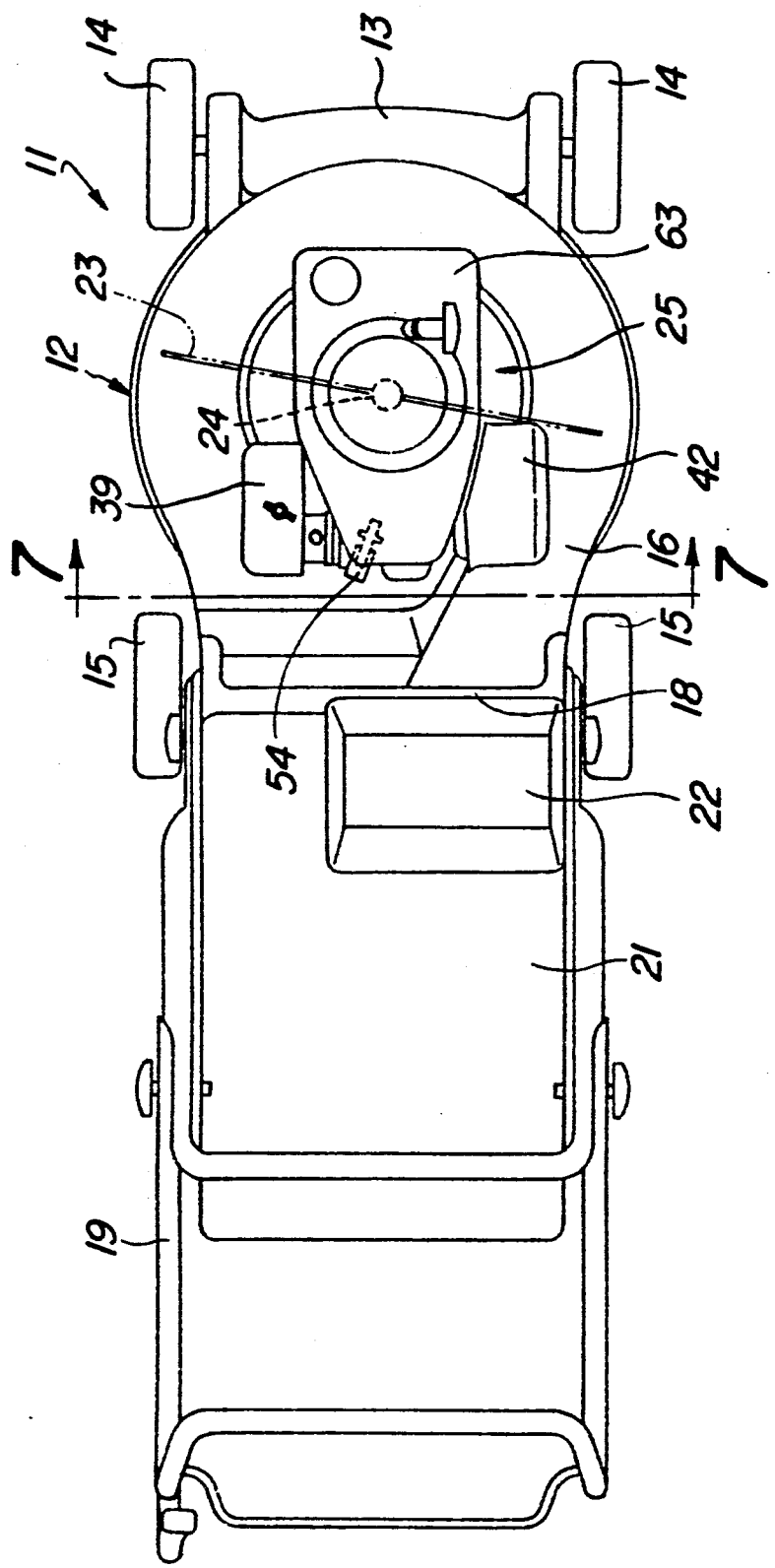
FIG. 1 is a top plan view of a rotary walk behind lawn mower constructed in accordance with an embodiment of the invention.
Figure 2:
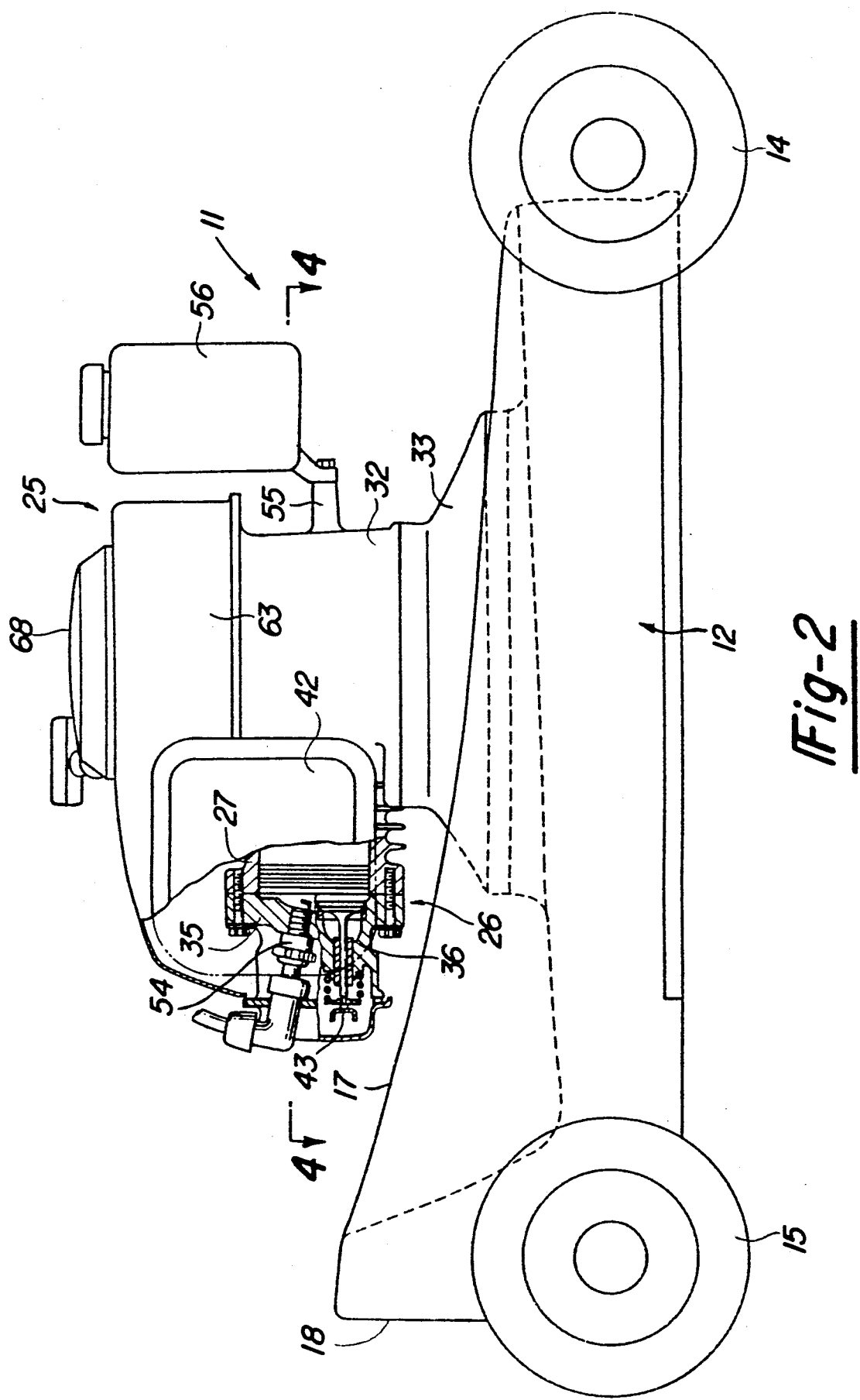
FIG. 2 is an enlarged side elevational view, with a portion broken away and other portions removed.

Referring first to FIGS. 1 and 2, a rotary type lawn mower constructed in accordance with an embodiment of the invention is identified generally by the reference numeral 11. The mower 11 is comprised of a main housing portion, indicated generally by the reference numeral 12 having a forwardly extending part 13 upon which a pair of front wheels 14 are journaled. As is well known in this art, the connection between the front wheels 14 and the mower housing 12 is such that a height adjustment may be made. The mower housing 12 further supports a pair of rear wheels 15 which, like the front wheels 14, are connected to the mower housing 12 by an arrangement to afford a height adjustment. The rear wheels 15 are more widely spaced apart than the front wheels 14.

The mower housing 12 is provided with a central portion 16 that defines a generally downwardly opening cavity (FIG. 7) that has a generally scroll shape. A rearwardly opening discharge chute is defined by an upwardly extending portion 17 of the housing central portion 16 with the discharge opening being identified by the reference numeral 18. As may be best seen in FIGS. 2 and 7, the discharge opening 18 extends rearwardly and is juxtaposed to one of the rear wheels 15.

A handle assembly 19 is pivotally connected to the mower housing 12 in an appropriate manner and is adapted to support a catcher 21 which may be of any suitable configuration and which has an inlet portion 22 that registers with the discharge chute 18 so that grass clippings cut by the mower will be thrown rearwardly into the catcher 21.

A rotary cutter blade 23 is journaled within the cavity of the main housing 12 for rotation about a generally vertically extending axis by means including a shaft 24. An internal combustion engine, indicated generally by the reference numeral 25 is supported on the upper side of the mower housing 12 and has its output shaft coupled to the mower shaft 24 for driving the cutter blade 23. Specifically, the cutter blade 23 may be directly affixed to the engine output shaft.

Figure 3:
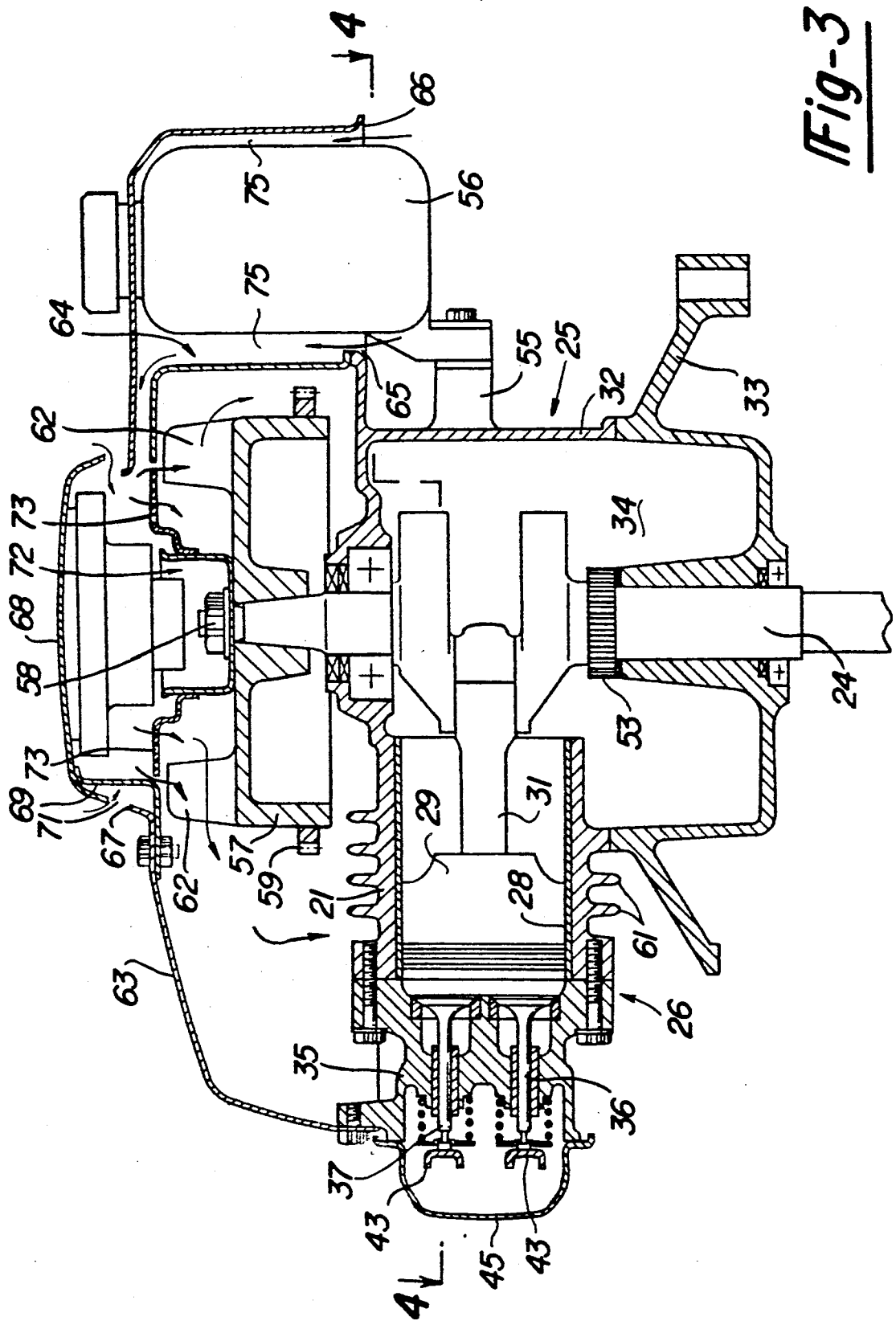
FIG. 3 is a further enlarged cross-sectional view showing the construction of the engine and the outer cowling arrangement.
Figure 4:
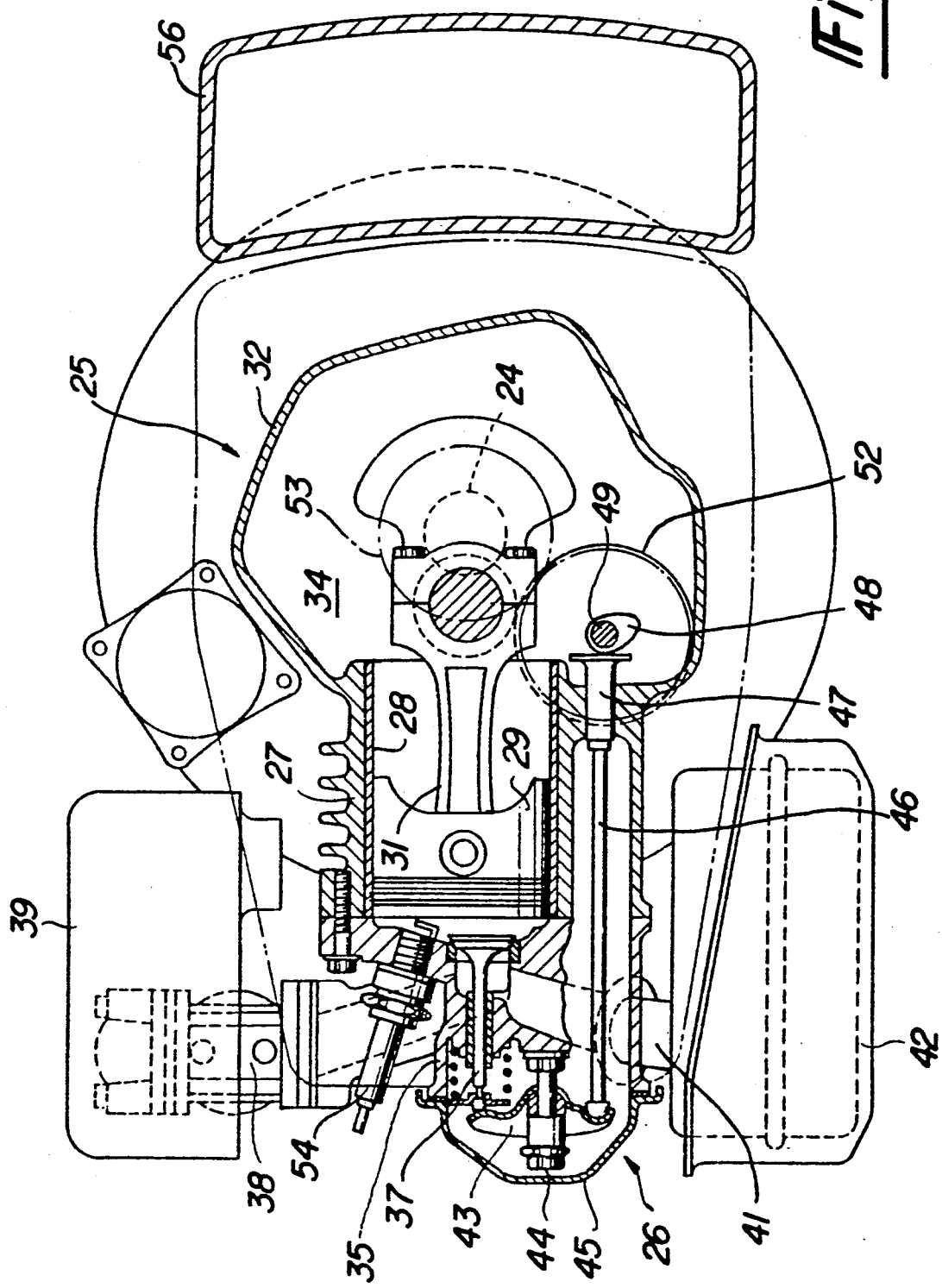
FIG. 4 is a cross-sectional view taken along the line 4—4 of FIG. 2.
Figure 6:
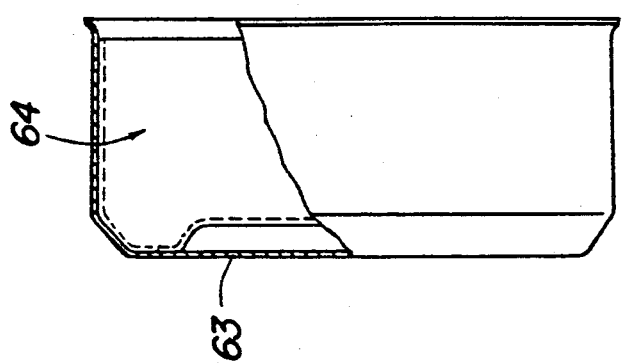
FIG. 6 is a cross-sectional view taken along the line 6—6 of FIG. 5.

Referring now primarily to FIGS. 3 and 4, the engine 25 is, in the illustrated embodiment, of the single cylinder, four cycle, air cooled type and includes a cylinder assembly, indicated generally by the reference numeral 26. The cylinder assembly 26 is comprised of a cylinder block 27 that defines a generally horizontally disposed cylinder bore 28. A piston 29 is supported for reciprocation within the cylinder bore 28 and is connected by means of a connecting rod 31 to a crankshaft 24 which, as aforenoted, comprises the shaft to which the cutter blade 23 is affixed.

The crankshaft 24 is rotatably journaled in a crankcase that is defined by a first generally downwardly facing cup shaped part 32 that is formed integrally with the cylinder block 27 and a mating lower piece 33. The pieces 32 and 33 define the crankcase chamber 34 which also provides a sump for lubricant, as is well known. The lower crankcase piece 33 provides a means by which the motor 25 may be affixed to the mower outer housing 12.

The cylinder assembly 26 further includes a cylinder head 35 that is affixed in a suitable manner to the cylinder block 27 and which forms a closure for the upper end of the cylinder bore 28. An intake valve 36 and an exhaust valve 37 are supported for reciprocation within the cylinder head 35 with the axes of reciprocation as defined by the stems of the valves 36 and 37 lying in a generally vertically disposed plane which is offset to one side of the axis of the cylinder bore 27. The intake valve 36 controls the flow of an intake charge through an intake passage which is formed in the cylinder head 35 and which communicates at its inlet end with a carburetor 38 that is disposed at one side of the cylinder head and rearwardly of the lawn mower 11 relative to the crankshaft axis. An air cleaner silencer assembly 39 is affixed to the carburetor 38 and supplies clean, silenced and filtered air to the carburetor 38.

The exhaust valve 37 controls the flow of exhaust gases through an exhaust passage formed in the cylinder head 35 to an inlet flange 41 of a muffler, indicated generally by the reference numeral 42. The muffler 42 silences the exhaust gases and discharges them to the atmosphere in a known manner. It should be noted that the muffler 42 is disposed to the rear end of the mower and is located at the side opposite to the carburetor 38 and air cleaner 39. As a result, these components will be positioned rearwardly of the main casing 12 so as to move the center of gravity of the assembly rearwardly for a reason to be described.

The valves 36 and 37 are operated by means of respective rocker arms 43 that are pivotally supported on the cylinder head 35 by pivot bolts 44. A rocker arm cover 45 is affixed to the cylinder head 35 and encloses the valve operating mechanism. The rocker arms 43 are, in turn, pivoted by means of respective push rods 46 that extend along one side of the cylinder block 23 and which are engaged by tappets 47 at the ends opposite to the rocker arms 43. The tappets 47 are slidably supported within the crankcase chamber 34 and are engaged with respective lobes 48 of a camshaft 49. The camshaft 49 is rotatably journaled in the crankcase chamber 34 about an axis that extends parallel to the axis of the crankshaft 24. A timing gear 52 formed on the camshaft 49 meshes with a timing gear 53 formed on the crankshaft 24 so as to rotate the camshaft 49 at one half crankshaft speed, as is well known in this art.

Figure 7:
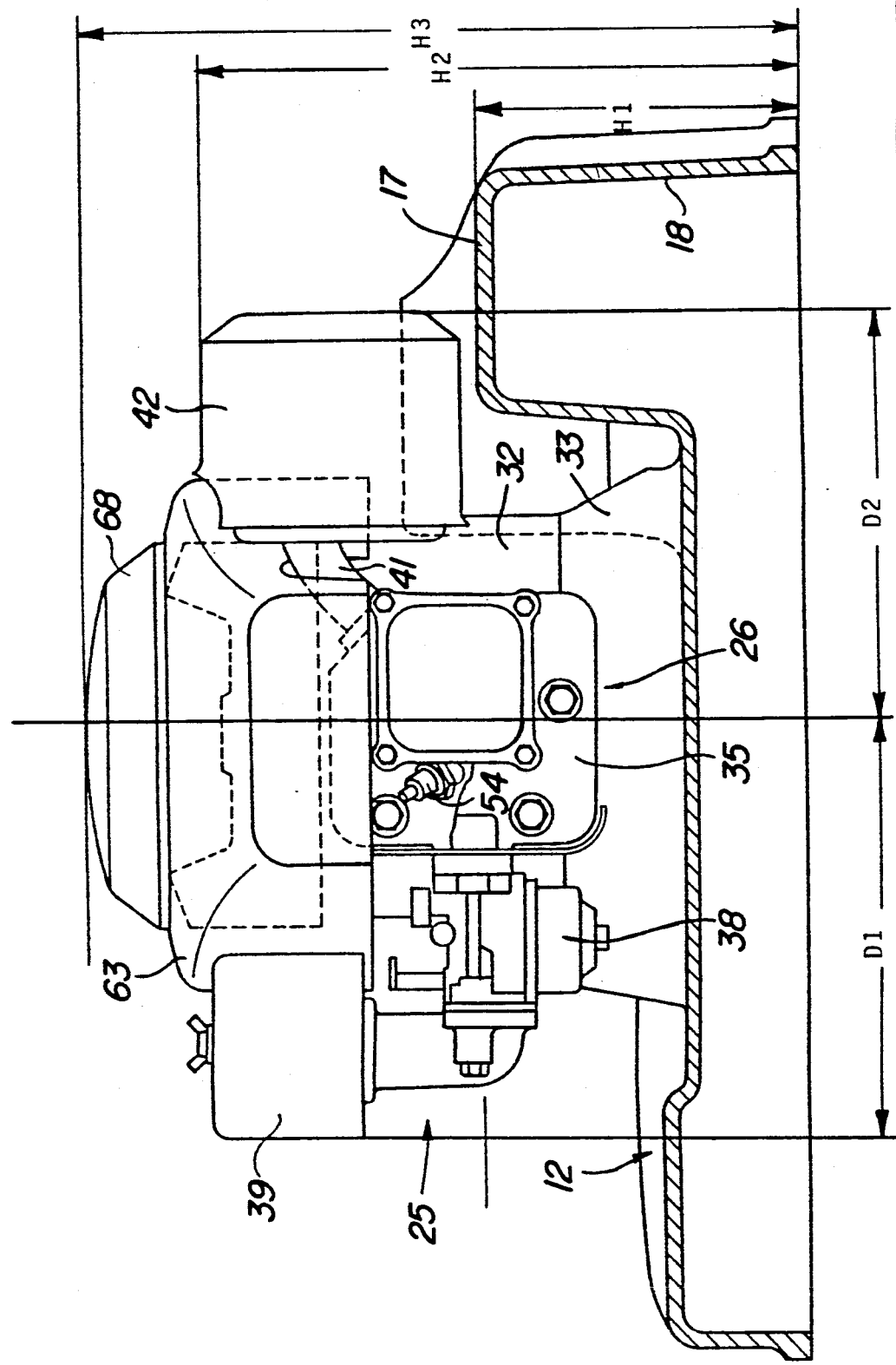
FIG. 7 is an enlarged cross-sectional view taken generally along the line 7—7 of FIG. 1.

The charge which is admitted to the combustion chamber of the engine through the intake valve 36 is fired by means of a spark plug 54 that is affixed to the cylinder head 35. The spark plug 54 is positioned at one side of the cylinder head away from the rocker arms 43 and toward the carburetor 38 as best shown in FIG. 7. This location of the spark plug 54 places it in a position wherein the spark plug 54 may be conveniently accessed for servicing.

As may be best seen in this Figure, the spark plug 54 is positioned at a lower level than the height of the discharge chute H1 and lower than the top of the muffler H3, the top of the air cleaner 39 and the upper most portion of the engine H3. This keeps a low center of gravity while, at the same time, maintaining the heavier components of the engine rearwardly of the axis of rotation of the crankshaft 24. This rearward disposition of the center of gravity permits the mower to be easily steered by raising the front wheels 14 from the ground.

The cylinder block crankcase portion 32 is provided with a pair of forwardly extending lugs 55 to which a fuel tank 56 is affixed, as by bolts. The fuel tank 56 is positioned at the forward end of the mower 11 and is thus forwardly displaced from the muffler 42. However, the fuel tank 56 is positioned closely adjacent the crankcase cavity 34 so as to avoid any significant forward bias of the center of gravity. Fuel is supplied from the fuel tank 56 to the carburetor 38 in any suitable manner, as by gravity flow through a conduit (not shown).

A flywheel 57 is affixed to the upper end of the crankshaft 24 by means including a nut 58 that is received on a threaded end of the crankshaft 24. The flywheel 57 has a peripheral gear 59 that may be utilized in conjunction with an electric starter (not shown) or a recoil starter for starting of the engine in a known manner. In addition, the flywheel carries a magnet arrangement for operating a magneto generator (not shown) also in a known manner.

In accordance with the invention, the engine 25 is air cooled and to this end the horizontally extending cylinder block 27 is provided with circumferentially extending cooling fins 61. The flywheel 57 is formed with integral fan blades 62 for circulating cooling air across the engine and the fins 61. In order to provide a controlled path for this air flow, the flywheel 57 and at least a portion of the engine itself including the cylinder 27 is enclosed by a cowling means including a first cowling member 63 that is affixed to the engine via the cylinder head 35 through a plurality of threaded fasteners, not all of which appear in the drawings.

Figure 5:
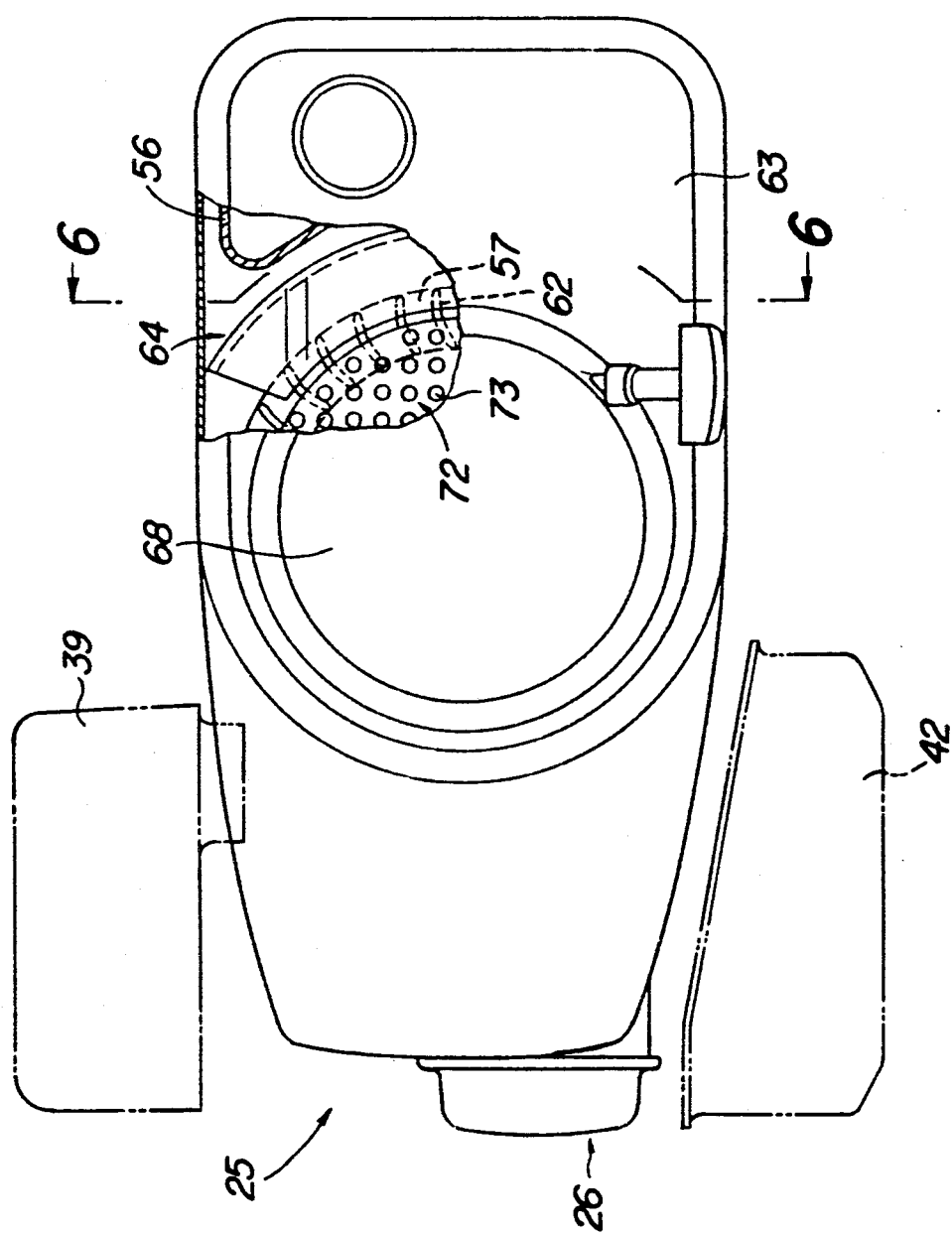
FIG. 5, is a partial top plan view of the engine with a portion broken away and other portions shown in phantom.

This cowling member 63 also extends across and encompasses the fuel tank 56 although the filler neck and closure cap for the fuel tank are exposed for facilitating filling. An internal baffle of arcuate shape, indicated generally by the reference numeral 64 is contained within the cowling member 63 and defines an arcuate path around the periphery of the fan blades 62 in the area adjacent the fuel tank 56 as best shown in FIG. 5. There is provided an annular air inlet gap 65 between the lower peripheral edge of the baffle plate 63 and the fuel tank 56 and also a downwardly extending annular air inlet gap 66 around the forward end of the fuel tank 56 for drawing cooling air into the fan blades 62 as shown by the arrows in FIG. 3.

The cowling member 63 is also provided with an upwardly extending flange 67 that defines a central opening over the flywheel 57. This opening is partially enclosed by a dome shape member 68 that is affixed to the cowling member 63 by means of a plurality of spaced brackets 69 so as to define an annular air inlet opening 71 through which cooling air may also be drawn. A cup shape member 72 is affixed which cooling air may also be drawn. A cup shape member 72 is affixed to the upper end of the flywheel 57 radially inwardly of the fan blades 62 and carries an outwardly extending annular perforate screen 73. As seen in FIG. 3, air may be drawn through the inlet openings 71 and passed downwardly through the openings in the screen 73 so as to flow across the fan blades in conjunction with the air drawn in through the inlet opening 65 and 66. The air is then driven downwardly across the engine and will exit through the opened lower face of the cowling member 63 and around the cylinder block 27 so as to ensure adequate cooling. In this way and because of the configuration as aforedescribed, it is ensured that there will be a good flow of cooling air and this cooling air is drawn primarily upwardly through the opening 65 and 66 in an area where there will be very few if any grass clippings. Furthermore, there is a vertically extending inlet channel 75 formed around these passages 65 and 66 which has sufficient height so that any grass clippings which may pass in this area will fall by gravity back onto the upper body of the mower where they can be easily removed. Any grass clippings which may inadvertently enter these channels will be trapped by the perforated plate 73 and hence cannot be lodged inside of the cowling 63.

Figure 8:
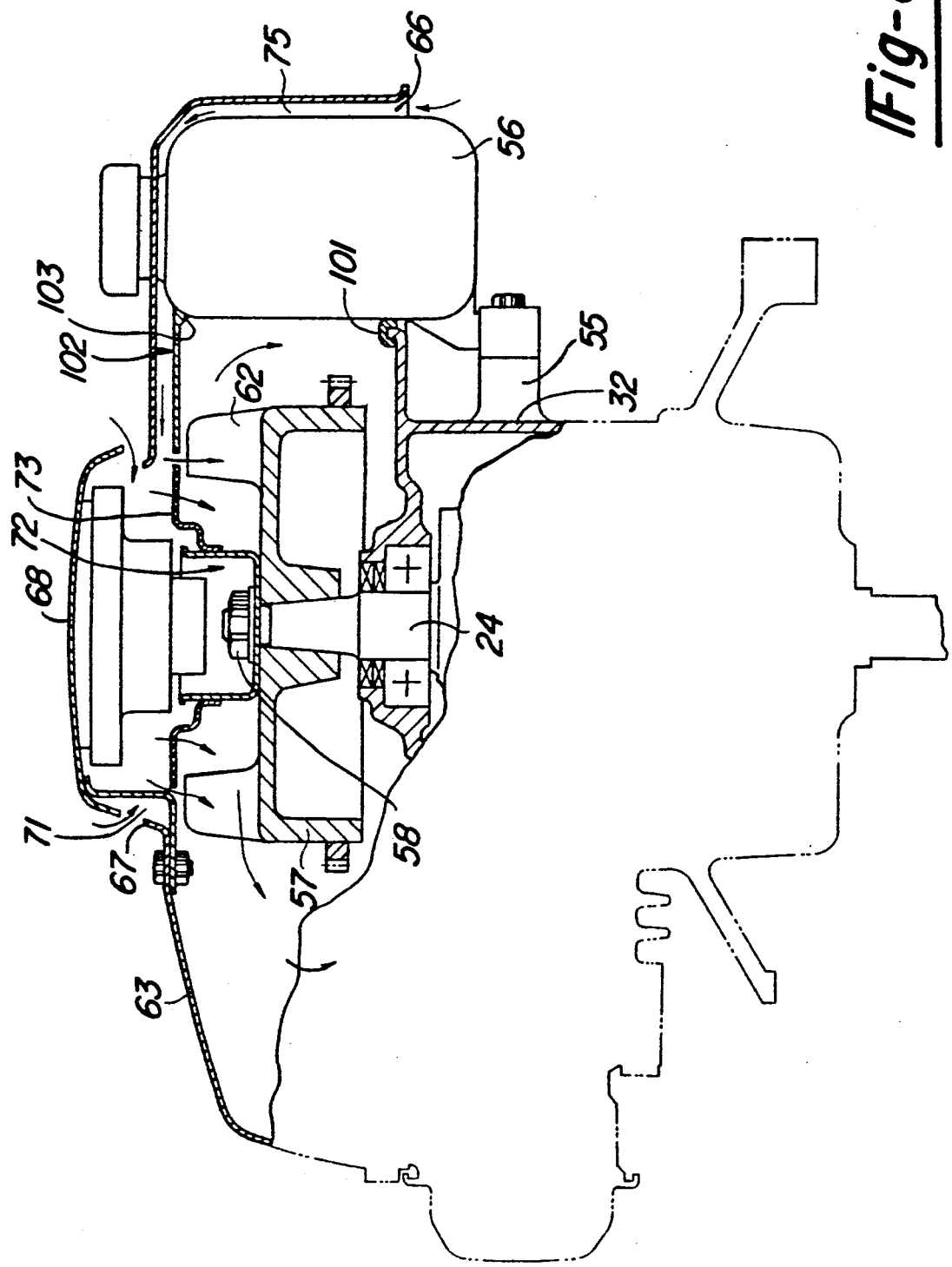
FIG. 8 is a partial cross-sectional view, in part similar to FIG. 3, showing another embodiment of the invention.

FIG. 8 shows an embodiment of the invention which is generally similar to the embodiment of FIGS. 1 through 7. The only difference in this embodiment from the previously described embodiment is that there is not provided an annular baffle 64 in this embodiment. Rather, the engine crankcase portion 32 carries a resilient seal 101 that sealingly engages the fuel tank 56 so that no air will be drawn inwardly on the inner periphery of the fuel tank. A baffle plate 102 is carried by the cowling member 63 and sealingly engages the fuel tank 56 at its upper end, as at 103. Hence, in this embodiment, the air gap 66 and channel 75 provide the sole source of air for the cooling system from the downwardly facing portions.

Figure 9:
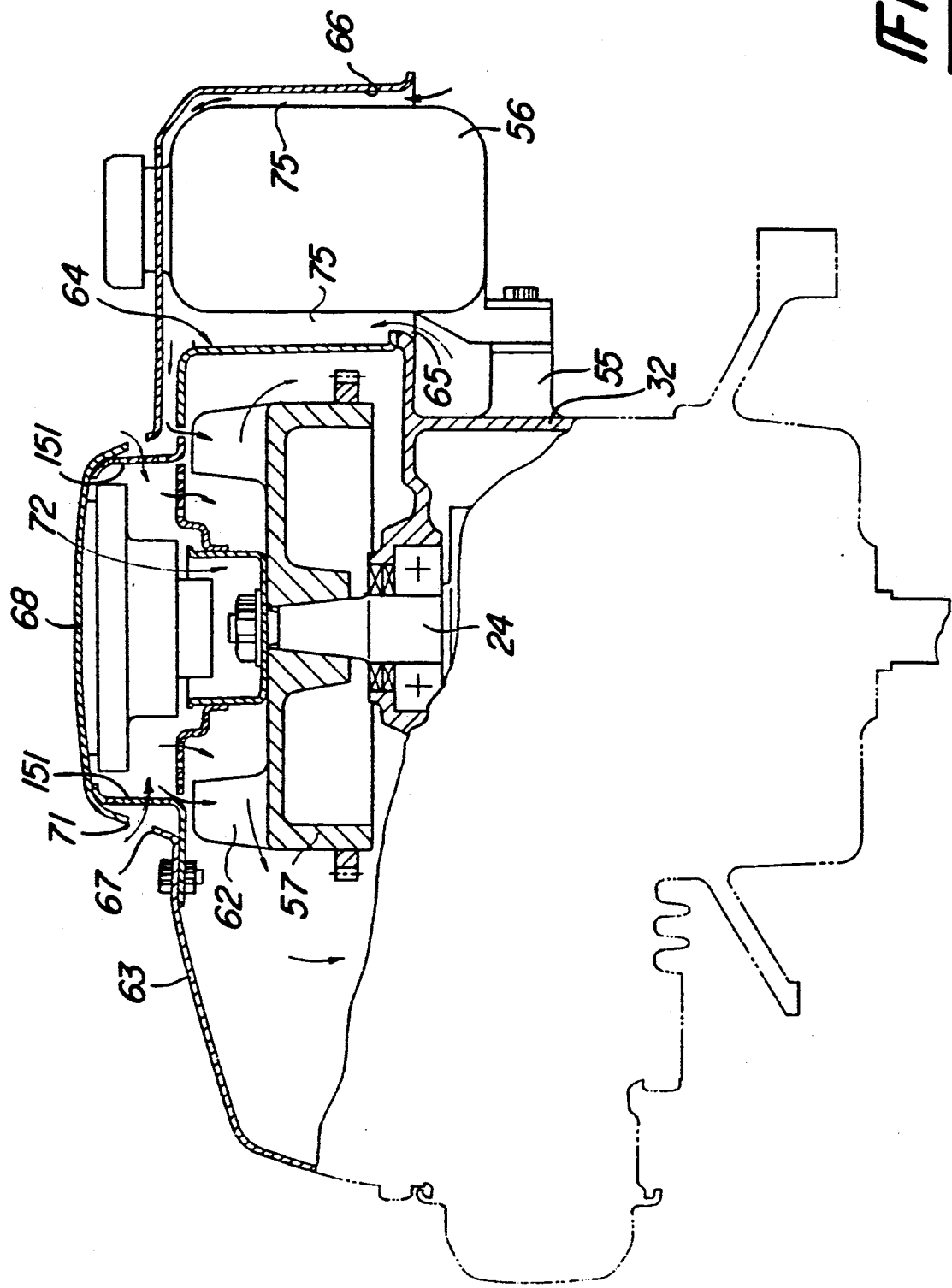
FIG. 9 is a partial cross-sectional view, in part similar to FIGS. 3 and 8, showing a further embodiment of the invention.

FIG. 9 shows yet another embodiment of the invention which is generally similar to the embodiment of FIGS. 1 through 7. However, in this embodiment, the dome shape member 68 is affixed to the cowling member 63 by an interconnecting member that extends circumferentially around the dome shape member 63 and is provided with a perforate wall 151 so that any external air delivered through the channel 71 must pass through this perforate wall 151 to prevent the induction of grass clippings for foreign material into the air cooling system.

It should be readily apparent from the foregoing description that an extremely effective air cooling system is provided for a rotary type lawn mower and one which will ensure that grass clippings cannot be drawn into the air cooling system for the engine and further that the engine will be supplied with a more than adequate supply of cooling air. Also, the components of the engine are laid out in such a way as to ensure that the center of gravity is placed rearwardly of the rotational axis of the cutting blade and, accordingly, it will be quite easy to steer the lawn mower by raising the front wheels off of the ground. Although a number of embodiments of the invention have been illustrated and described, various changes and modifications may be made without departing from the spirit and scope of the invention, as defined by the appended claims.

We claim:

1. A rotary lawn mower having an outer housing defining a downwardly opening cavity, a cutting blade supported within said cavity for rotation about a generally vertically extending axis, an air cooled internal combustion engine supported by said outer housing above said cavity, said engine comprising at least one cylinder having its axis extending horizontally and an output shaft rotating about a vertically extending axis positioned forwardly of said cylinder, means for driving said cutting blade from said engine output shaft, a fan driven by said output shaft and lying above said cylinder, and cowling means enclosing said fan and enclosing at least the upper side of said cylinder and at least other portions of said engine for directing the flow of cooling air circulated by said fan, said cowling means defining an air inlet opening for said cowling means spaced forwardly from said cylinder and forwardly from said output shaft axis to draw inlet air from an area below said fan and in proximity to said outer housing to avoid the drawing of cut grass into said cowling means and a discharge extending downwardly from and around said cylinder.

2. A rotary lawn mower as set forth in claim 1 wherein the outer housing is formed with a discharge chute for directing grass clippings, said discharge chute being spaced from the air inlet opening.

3. A rotary lawn mower as set forth in claim 1 wherein the outer housing is formed with a grass discharge chute that is directed in a direction facing away from the air inlet.

4. A rotary lawn mower as set forth in claim 3 wherein the discharge chute is spaced from the air inlet opening.

5. A rotary lawn mower as set forth in claim 1 wherein the outer housing has scroll shape and the cylinder overlies at least in part the scroll shaped portion.

6. A rotary lawn mower as set forth in claim 5 wherein the scroll shape defines a discharge chute for the cut grass and wherein the engine is provided with a muffler that the spaced vertically above the upper end of the discharge chute.

7. A rotary lawn mower as set forth in claim 5 wherein the engine is provided with a carburetor drawing air through an air cleaner and wherein the housing defines a discharge chute with at least a portion of the carburetor being positioned vertically above the discharge chute.

8. A rotary lawn mower as set forth in claim 7 wherein the engine is further provided with an exhaust system including a muffler which muffler is positioned vertically above the discharge chute.

9. A rotary lawn mower as set forth in claim 8 wherein the outer housing is supported for movement along the ground of four wheels journaled at the peripheral edges of the outer housing.

10. A rotary lawn mower as set forth in claim 9 wherein the center of gravity of the lawn mower is disposed rearwardly of the rotational axis of the cutting blade for facilitating steering of the mower by lifting the front wheels from the ground.

* * * * *